United States Patent
Iwashita et al.

[11] Patent Number: 5,955,863
[45] Date of Patent: Sep. 21, 1999

[54] ELECTRIC CURRENT CONTROL METHOD FOR A SERVOMOTOR

[75] Inventors: Yasusuke Iwashita, Oshino-mura; Hiroyuki Kawamura, Kawaguchiko-machi, both of Japan

[73] Assignee: Fanuc Ltd., Yamanashi, Japan

[21] Appl. No.: 08/836,732

[22] PCT Filed: Sep. 24, 1996

[86] PCT No.: PCT/JP96/02745

§ 371 Date: May 22, 1997

§ 102(e) Date: May 22, 1997

[87] PCT Pub. No.: WO97/11525

PCT Pub. Date: Mar. 27, 1997

[30] Foreign Application Priority Data

Sep. 22, 1995 [JP] Japan ................................ 7-268010

[51] Int. Cl.⁶ .................................................... H02P 3/18
[52] U.S. Cl. ............................................................. 318/812
[58] Field of Search .................................... 318/800, 808, 318/560, 567, 568.23, 569, 570, 609, 610

[56] References Cited

U.S. PATENT DOCUMENTS

| | | | |
|---|---|---|---|
| 5,006,770 | 4/1991 | Sakamoto et al. | 318/561 |
| 5,297,071 | 3/1994 | Sugino | 364/736 |
| 5,467,000 | 11/1995 | Bauer et al. | |
| 5,637,969 | 6/1997 | Kato et al. | 318/432 |
| 5,701,066 | 12/1997 | Matsuura et al. | 318/808 |

FOREIGN PATENT DOCUMENTS

| | | |
|---|---|---|
| 0 476 588 | 3/1992 | European Pat. Off. . |
| 0 597 118 | 5/1994 | European Pat. Off. . |
| 0 633 653 | 1/1995 | European Pat. Off. . |
| 6-85637 | 10/1994 | Japan . |
| 8-182397 | 7/1996 | Japan . |
| 2 243 464 | 10/1991 | United Kingdom . |

OTHER PUBLICATIONS

Dong Seong Oh et al: "New Rotor Parameter Estimation for a Flux and Speed Control of Induction Machine Considering Saturation Effects", Proceedings of the International Conference on Industrial Electronic Control and Instrumentation (IECON), Kobe, Oct. 28–Nov. 1, 1991, vol. 1, No. Conf. 17, Oct. 28, 1991, pp. 561–566. Institute of Electrical and Electronics Engineers.

Le–Huy et al.: "Analysis and Implementation of a Real–Time Predictive Current Controller for Permanent–Magnet Synchronous Servo Drives", IEEE Transactions on Industrial Electronics, vol. 41, No. 1, Feb. 1994, pp. 110–117.

Primary Examiner—William M. Shoop, Jr.
Assistant Examiner—Kim Lockett
Attorney, Agent, or Firm—Staas & Halsey

[57] ABSTRACT

An electric current control method for a servomotor using DQ conversion capable of increasing an acceleration torque and stabilizing a current control for deceleration when a voltage is saturated. It is determined whether the voltage command is saturated over a maximum voltage which a power amplifier is able to output (Step T1). When the voltage command is saturated, a saturation process is performed for rewriting an integrator of a Q-phase current control loop (Step T2), it is further determined whether the servomotor is in acceleration or deceleration (Step T3) and a further saturation process is performed for rewriting an integrator of a D-phase current control loop (Step T4) only when it is determined that the servomotor is in deceleration.

10 Claims, 13 Drawing Sheets

D-PHASE VOLTAGE

Q-PHASE VOLTAGE

IN THE CASE WHERE D-PHASE SATURATION PROCESS IS PERFORMED IN ACCELERATION

IN THE CASE WHERE D-PHASE SATURATION PROCESS IS NOT PERFORMED IN ACCELERATION

D-PHASE VOLTAGE

Q-PHASE VOLTAGE

ELECTRIC CURRENT CONTROL METHOD FOR A SERVOMOTOR

TECHNICAL FIELD

The present invention relates to an electric current control method for an AC servomotor to be used as a drive source in a machinery such as a machining tool and an industrial machine, or a robot.

BACKGROUND ART

FIG. 10 is a block diagram showing a control system of a conventional AC servomotor. In this control system, a position feedback value detected by an encoder, etc. is subtracted from a position command to obtain a position deviation, and the obtained position deviation is then multiplied by a position gain in term 1 to obtain a speed command by a position loop control. A speed feedback value is subtracted from the speed command to obtain a speed deviation, and a speed loop process of a proportional-plus-integral control is performed in term 2 to obtain a torque command (current command). Further, a current feedback value is subtracted from the torque command and a current loop process is performed in term 3 to obtain a voltage command of each phase. Based on the voltage commands, the AC servomotor M is controlled by a PWM control, etc.

In controlling a three-phase AC servomotor in the above-mentioned control system, an alternating current control method for controlling currents of three phases individually in a current loop. In this current control method, a torque command (current command) obtained by the speed loop process is multiplied by each of sine waves which are shifted by an electrical angle of $2\pi/3$ for U, V and W phases, respectively from a rotor position $\theta$ of the servomotor detected by the encoder, to obtain a current command of each phase. Then, current deviations are obtained by subtracting actual currents Iu, Iv, Iw detected by current detectors from the three current commands, respectively, and a proportion-plus-integral (PI) control for currents of the individual phases is performed to output command voltages Eu, Ev, Ew for the respective phases to the power amplifier. In the power amplifier, PWM control is performed by an inverter, etc. to provide currents Iu, Iv, Iw for the individual phases to flow in the servomotor M, thus driving the servomotor M. As a result, a current loop is formed as the innermost minor loop of the position and speed loops, and this current loop controls a current flowing in each phase of the AC servomotor.

In the above method for controlling the currents of the three phases separately, since the frequency of each current command rises as the rotational speed of the motor increases to cause the gradual phase lag of the current, the reactive component of current increases to rise a problem that torque cannot be generated with good efficiency. Also, since the controlled variable is alternating current, even in a steady state in which the rotational speed and the load are constant, deviations such as a phase lag with respect to the command, attenuation of the amplitude, etc. occur, making it difficult to attain torque control comparable to that attainable with a direct-current motor.

As a solution to the above problems, a DQ control method is known in which the three-phase current is converted into a two-phase, i.e., D- and Q-phase, in direct-current coordinate system through a DQ conversion, and then the individual phases are controlled by direct-current components. FIG. 11 illustrates a control system in which an AC servomotor is controlled through the DQ conversion. It is assumed that the D-phase current command is "0", and that the current command for Q-phase is a torque command outputted from the speed loop. In a converter 9 for converting the three-phase current to a two-phase current, D- and Q-phase currents Id and Iq are obtained by using actual currents of u-, v- and w-phases of the motor, and the phase of the rotor detected by a rotor position detector 7, and the currents thus obtained are subtracted from the command values of the respective phases, to obtain D- and Q-phase current deviations. In current controllers 5d and 5q, the respective current deviations are subjected to proportional and integral control, to obtain d- and q-phase command voltages Vd and Vq, respectively. Another converter 8 for converting the two-phase voltage to a three-phase voltage, obtains u-, v- and w-phase command voltages Vu, Vv and Vw from the two-phase command voltages Vd and Vq, and outputs the obtained command voltages to a power amplifier 6, whereby currents Iu, Iv and Iw are fed to the respective phases of the servomotor by means of inverters etc. to control the servomotor.

Generally, the D-phase and Q-phase voltages Vd, Vq converted by DQ conversion can be expressed by the following equation (1):

$$\begin{bmatrix} Vd \\ Vq \end{bmatrix} = \begin{bmatrix} R+sL & -\omega L \\ \omega L & R+sL \end{bmatrix} \cdot \begin{bmatrix} Id \\ Iq \end{bmatrix} + \begin{bmatrix} 0 \\ \omega\phi \end{bmatrix} \quad (1)$$

Therefore, $$\begin{cases} Vd = (R+sL)Id - \omega L \cdot Iq \\ Vq = \omega\phi + (R+sL)Iq + \omega L \cdot Id \end{cases}$$

Now assuming that $R+sL=Z$, the following equations (1)' are obtained.

$$\begin{cases} Vd = Z \cdot Id - \omega L \cdot Iq \\ Vq = \omega\phi + Z \cdot Iq + \omega L \cdot Id \end{cases} \quad (1)'$$

Adopting a direct-current control method by DQ conversion, it is possible to reduce a usual deviation without setting a current loop gain in an unnecessarily high level. However, in order to realize the direct-current control method, a large torque is necessary in sudden acceleration at high speed rotation and, therefore, the current command may exceed the limit of the power amplifier to cause a so-called voltage saturation so that the current is difficult to control.

In this case, the value of the integrator of the current loop increases. If the value of this integrator becomes excessively large, a maximum voltage command is kept being outputted for a while, even after the current command becomes smaller, so that an operation of the current loop after the saturation of the voltage command would not be stable.

To cope with this problem, it has been a common practice to perform the following saturation process. FIG. 12 shows D-phase and Q-phase control systems of a conventional AC servomotor, and FIG. 13 shows D-phase and Q-phase command voltages in the saturation process.

In FIG. 12, D-phase and Q-phase controllers are provided with an integral term 11, 12 (K1 is an integral gain) and a proportional term 13, 14 (K2 is a proportional gain), respectively, and the motor is represented by a resistance R and an inductance L. The D-phase and Q-phase controllers are provided with mutual interference terms 15, 16, respectively.

In FIG. 13, assuming that Vc represents a composite command voltage of the D-phase and Q-phase command voltages Vd, Vq and that Vdc represents a DC link voltage which is the maximum output voltage of the power amplifier, the saturation process is performed in the following manner.

(1) The voltage command Vc is outputted as it is, in the relationship $Vd^2+Vq^2 \leq Vdc^2$ (the vector of the composite command voltage Vc is within or on a circle of the DC link voltage).

(2) The D-phase and Q-phase voltages Vd, Vq of the voltage command Vc are clamped in the following values, in the relationship $Vd^2+Vq^2>Vdc^2$ (the vector of the composite command voltage Vc is out of the circle of the DC link voltage).

$$Vd = Vdc \cdot Vd/(Vd^2+Vq^2)^{1/2} \quad (2)$$

$$Vq = Vdc \cdot Vq/(Vd^2+Vq^2)^{1/2} \quad (3)$$

And the values of the integrators are rewritten so that the outputs of the D-phase and Q-phase current controllers are the clamped D-phase and Q-phase voltages Vd, Vq, respectively.

Assuming that k1 represents an integral gain of the current loop, k2 represents a proportional gain of the current loop, I represents a torque command and Ifb represents a current feedback, the voltage command Vc is expressed by the following equation (4).

$$Vc = k1 \cdot (I-Ifb)/s - k2 \cdot Ifb \quad (4)$$

From the equation (4), the maximum voltage command Vcmax set by the foregoing clamping is expressed by the following equation (5).

$$Vcmax = k1 \cdot (I-Ifb)/s^* - K2 \cdot Ifb \quad (5)$$

The integrator represented by $1/s^*$ is set so that the current controller outputs the maximum voltage command Vcmax, and is expressed by the following equation (6).

$$1/s^* = (Vcmax + k2 \cdot Ifb)/k1 \quad (6)$$

The integrators for the D-phase and Q-phase current control loops are expressed as follows:

$$D \text{ phase: } 1/s^* = (Vdmax + k2 \cdot dfb)/k1 \quad (6\text{-}1)$$

$$Q \text{ phase: } 1/s^* = (Vqmax + k2 \cdot qfb)/k1 \quad (6\text{-}1)$$

By the saturation process of rewriting the integrators, the current controllers output the clamped D-phase and Q-phase voltages to restrict the composite voltage output Vc always within the DC link voltage Vdc.

However, in the conventional current control method in which the saturation process is performed for both the D and Q phases in saturation of the voltage command, the acceleration characteristic would be lowered.

In the current control using DQ conversion, the D-phase current Id in the same orientation of magnetic flux $\phi$ is set to "0" and the Q-phase current Iq perpendicular to the D-phase current Id is controlled so as to follow the torque command. Assuming that $\omega$ represents an angular speed of the rotor, $\omega>0$ and $Iq>0$ when the rotor is rotating forward and is being accelerated. The D-phase and Q-phase voltages at that time is shown in a vector diagram of FIG. 14.

When the composite vector voltage Vc of the D-phase and Q-phase command voltages Vd, Vq exceeds the voltage limit value Vlim (Vdc), the composite vector voltage Vc is converted into a voltage Vc' by changing its magnitude to Vlim with its phase unchanged so that the command voltages are clamped. This relation can be expressed by the following equations.

$$Vd = Vlim \cdot \sin\theta \quad (7)$$

$$Vq = Vlim \cdot \cos\theta \quad (8)$$

With respect to the phase $\theta$, there is a relation $\tan\theta = Vd/Vq$.

FIG. 15a shows the relation between the D-phase command voltage and the current, and FIG. 15b shows the relation between the Q-phase command voltage and the current, when the composite voltage Vc does not exceed the voltage limit value Vlim.

In the current control system by D-Q conversion, the D-phase current command to flow an invalid current is set to "0" and the current control is performed by the Q-phase current command. At that time, as is shown by the equation (1), a negative voltage ($-\omega L \cdot Iq$) is generated in the D phase due to the voltage interference in the motor.

In the case where the composite voltage Vc does not exceed the voltage limit value Vlim, the D-phase command voltage Vd reaches the interference voltage ($-\omega L \cdot Iq$) as shown in FIG. 15a, so that no current flows in the D phase. Therefore, any interference voltage due to the D-phase current does not appear in the Q phase.

When the D-phase and Q-phase command voltages are clamped as the composite command voltage Vc exceeds the voltage limit value Vlim, the D-phase command voltage Vd can not reach the interference voltage ($-\omega L \cdot Iq$), so that a positive current Id flows in the D phase as shown in FIG. 16a. This positive D-phase current Id adds ($\omega L \cdot Iq$) to the Q-phase voltage Vq in FIG. 16b, thus increasing the Q-phase voltage Vq as expressed by the following equation (9):

$$Vq = \omega\phi + Z \cdot Iq + \omega L \cdot Id \quad (9)$$

Namely, when the command voltages are clamped by voltage saturation during acceleration, the D-phase voltage Vd is decreased and the Q-phase voltage Vq is increased by the Q-phase current Iq, so that the phase $\theta$ of the clamped composite voltage Vc decreases to the composite voltage Vc" indicated by a dotted line in FIG. 14. If the phase $\theta$ is delayed as the D-phase current Id increases, the generated torque decreases. In other words, when the Q-phase voltage is clamped to the DC link voltage Vdc, an adequate voltage for increasing the Q-phase current is difficult to obtain by the increase of the D-phase current Id, thus lowering the acceleration characteristic of the servomotor.

In FIG. 17 showing a relation between the D-phase and Q-phase voltages, when the current flows in the positive direction in the D phase during acceleration, the vector voltage is shifted inwardly of the DC link voltage as indicated by a reference character A, so that the voltage saturation is relieved. Contrary, when the current flows in the negative direction in the D phase, the vector voltage is shifted outwardly of the DC link voltage as indicated by a reference character B, so that the voltage saturation is promoted. As is understood from the equation (1), since the current flows usually in the negative direction in the D phase due to the voltage interference during acceleration, the voltage saturation is promoted.

SUMMARY OF THE INVENTION

It is an object of the present invention to increase an accelerating torque and also to stabilize a deceleration current control when a voltage command is saturated, in a current control of a servomotor using DQ conversion.

According to the present invention, if the voltage command is saturated, a saturation process is performed to rewrite the value of an integrator in the D-phase current control loop only when the servomotor is in deceleration in the current control of the servomotor using the DQ conversion. If a voltage command is saturated in acceleration, a saturation process is performed to rewrite only an integrator in the Q-phase current control loop. As a result, an accelerating torque is increased and also the deceleration current control is stabilized when the voltage command is saturated.

A large torque is necessary to sharply accelerate a servomotor in high-speed rotation. In such event, if the vector sum of the D-phase and Q-phase voltage commands exceeds the voltage limit value of a power amplifier to be in saturation, the output of the power amplifier is restricted to a clamped voltage command so that the current control of the servomotor can not be performed.

To cope with this problem, when the servomotor is in acceleration, the saturation process is performed for the Q phase but not for the D phase, to rewrite a value of an integrator in the Q-phase current control loop. The saturation process for the Q phase restricts the value of the integrator in the current loop and prevents the maximum voltage command from being continuously outputted when the current command decreases, so as to stabilize the deceleration current control of the current loop after the voltage command is saturated. Further, as the saturation process is not performed for the D phase, the D-phase voltage is outputted without restriction so as to control the D-phase current, which is produced by the voltage interference, to be zero and also increase the accelerating torque by increasing the Q-phase current.

In deceleration, the saturation process is performed for both of the D and Q phases to rewrite the integrators in the current control loops for the D-phase and Q-phase. The value of the integrators of the current loop are thus restricted not to increase and also the maximum voltage command is prevented from being continuously outputted when the current command decrease, thus stabilizing the deceleration current control in the current loop after the voltage command is saturated. In deceleration, since the D-phase current produced by the voltage interference acts in such a direction to decrease the Q-phase current, the saturation process is performed for the D phase since it is not necessary to control the D-phase current by the D-phase voltage.

BEST MODE FOR CARRYING OUT THE INVENTION

Figure 1:
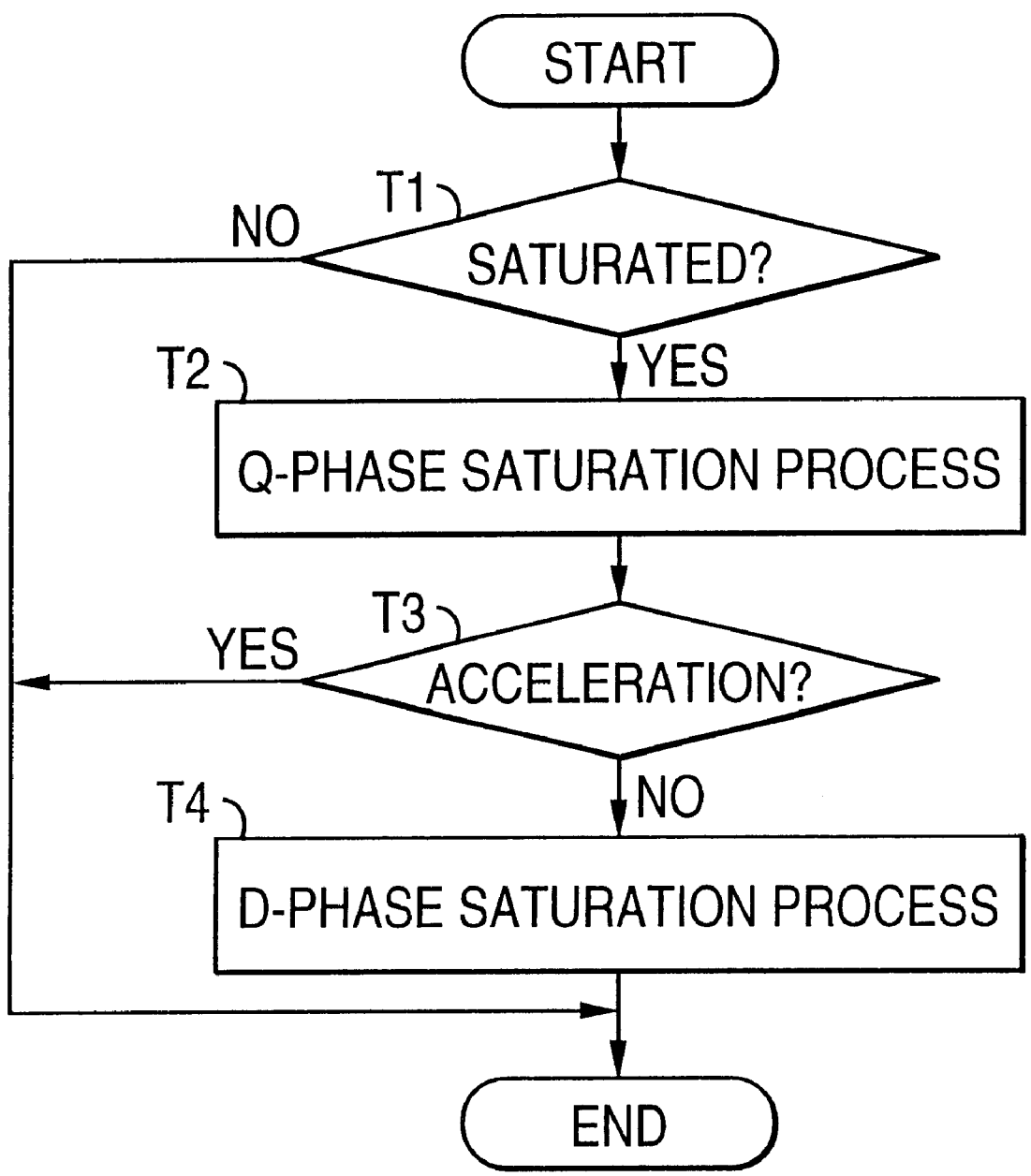
FIG. 1 is a flowchart generally showing the current control method for a servomotor according to the present invention.

The general procedure of a current control method for a servomotor, according to the present invention will be described referring to the flowchart of FIG. 1. In Step T1, it is determined whether a voltage command is saturated. If the voltage command is not saturated, a current loop process rather than a saturation process is performed. If the voltage command is saturated, the procedure proceeds to Step T2 to perform a saturation process to rewrite an integrator based on the voltage command clamped with respect to the Q phase.

In Step T3, it is determined whether the servomotor is controlled to be accelerated. If the servomotor is to be accelerated, the current loop process is performed without performing the saturation process with respect to the D phase. If the servomotor is not to be accelerated, the procedure proceeds to Step T4 to perform the current loop process after the saturation process with respect to the D phase.

With the above procedure, it is possible to achieve two effects of increasing an acceleration torque and also stabilizing a current control in deceleration when the voltage command is saturated.

Figure 2:
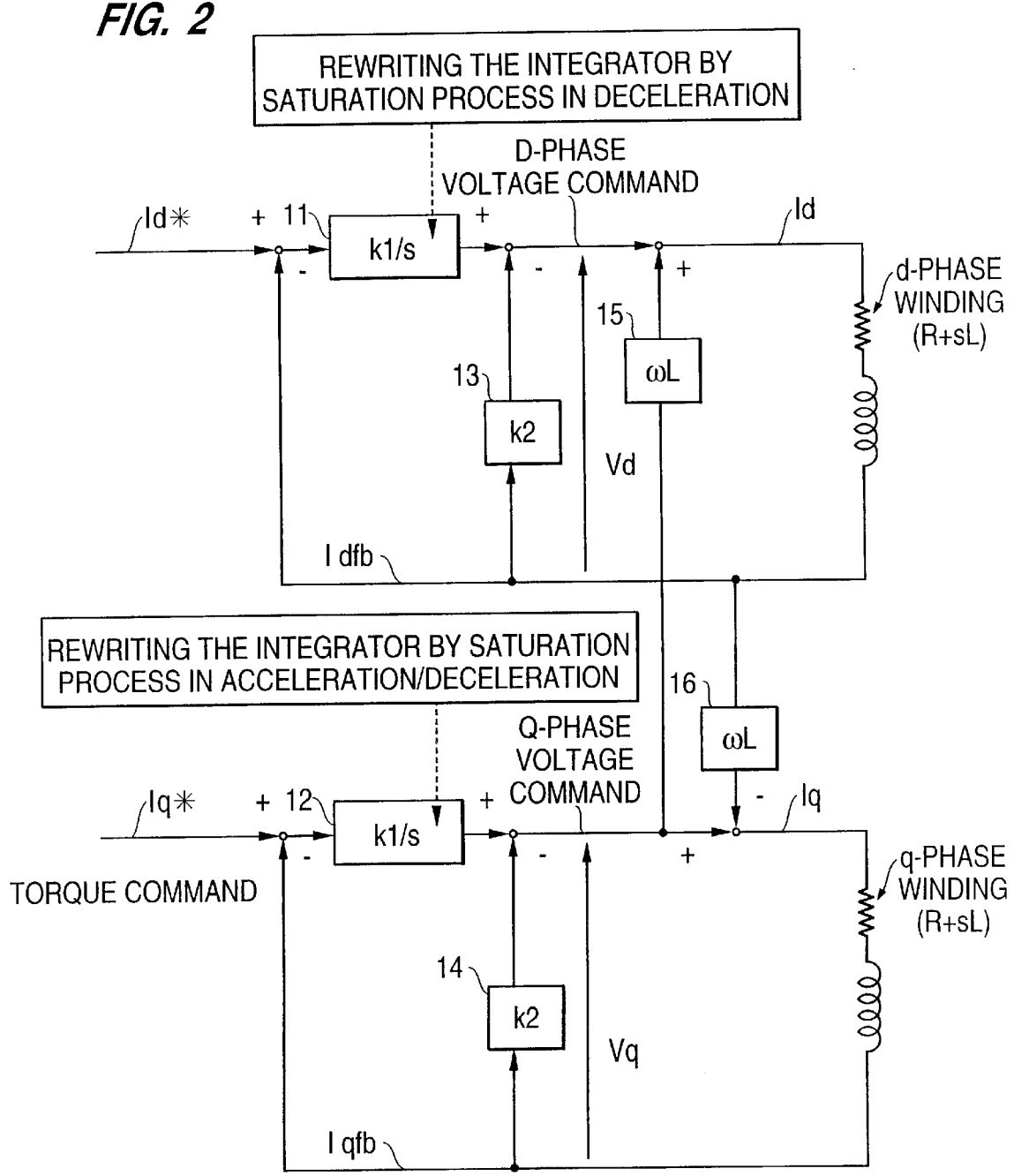
FIG. 2 is a block diagram showing D-phase and Q-phase control systems for an AC servomotor, for carrying out the method of the invention.
Figure 12:
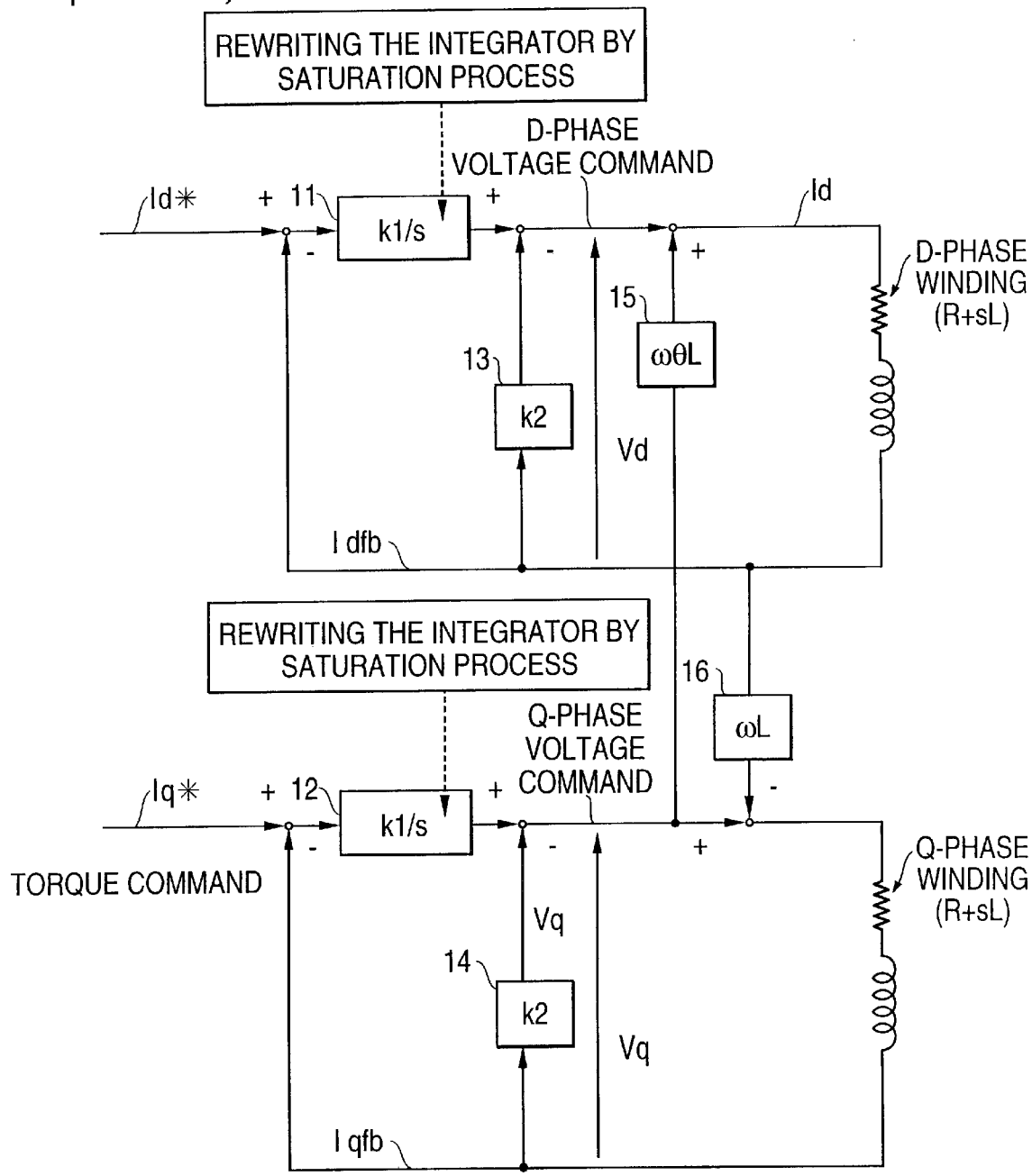
FIG. 12 is a block diagram showing conventional D-phase and Q-phase control systems for an AC servomotor.
Figure 13:
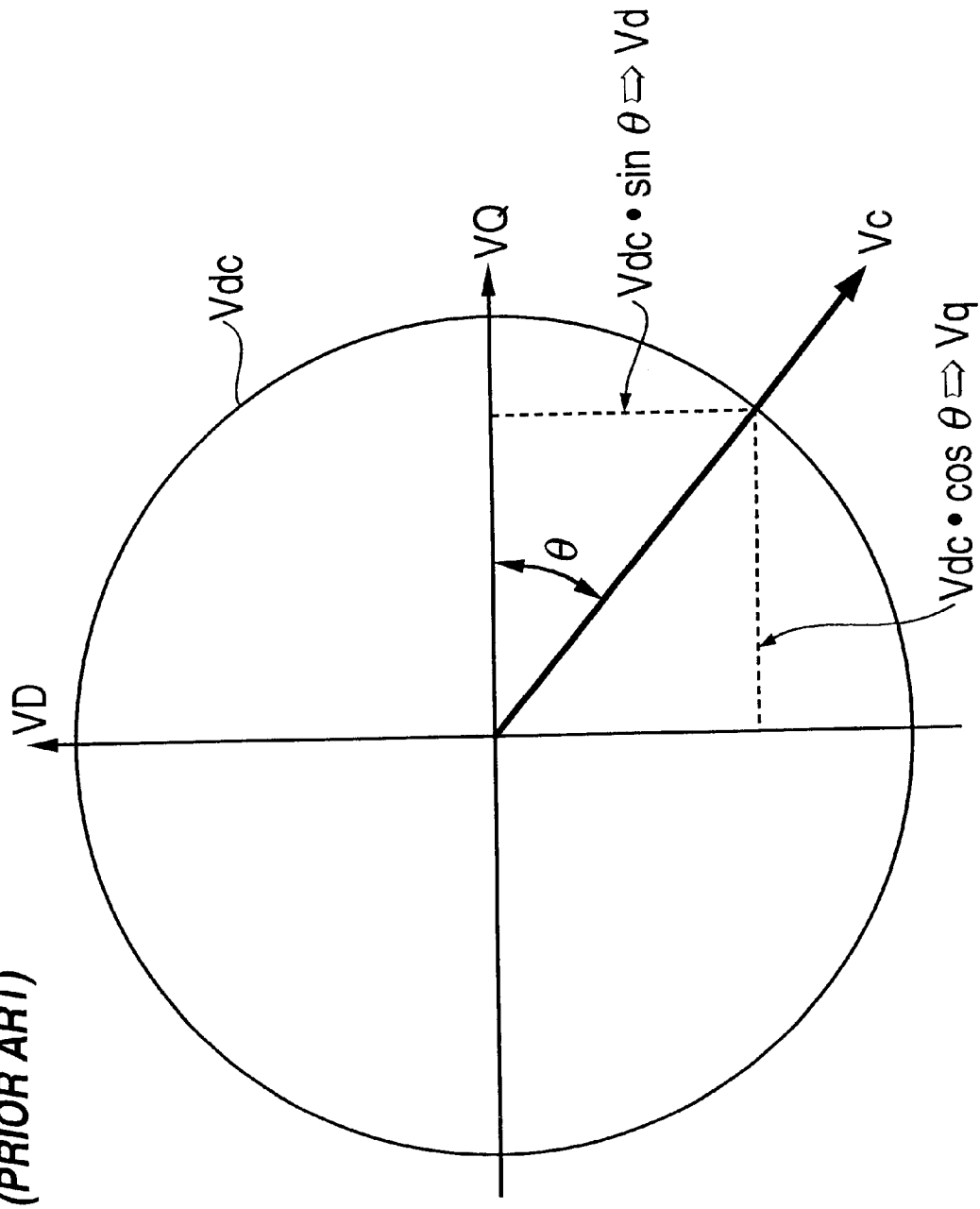
FIG. 13 is a vector diagram showing a saturation process of the command voltage.
Figure 14:
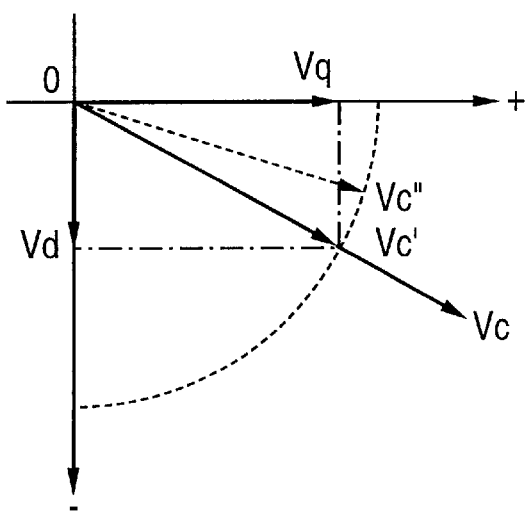
FIG. 14 is a vector diagram showing D-phase and Q-phase voltages in saturation process.
Figure 15A:
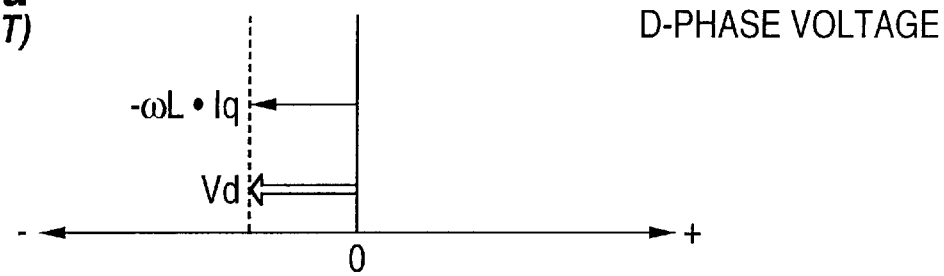
FIGS. 15a and 15b are diagrams for showing D-phase and Q-phase voltages when a composite voltage Vc does not exceed a voltage limit.
Figure 15B:
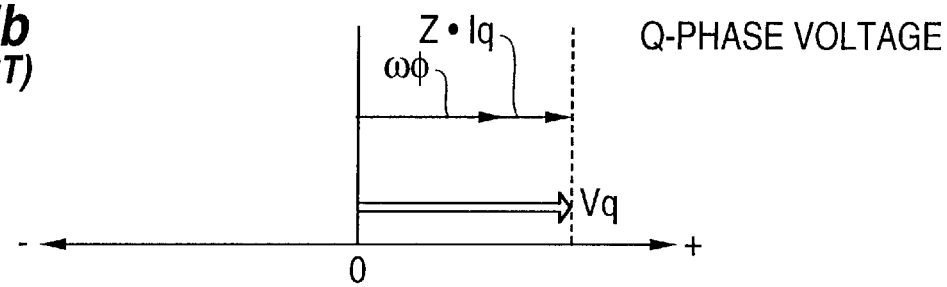

FIG. 2 is a block diagram of a control system for an AC servomotor for carrying out the present invention, as it is divided into D-phase and Q-phase control systems. In FIG. 2, D-phase and Q-phase controllers are provided with an integral term 11, 12 (K1 is an integral gain) and a proportional term 13, 14 (K2 is a proportional gain), respectively, and the motor is represented by a resistance R and an inductance L. The D-phase and Q-phase controllers are provided with mutual interference terms 15, 16, respectively. The above arrangement of the control system is identical with that of the conventional control system as shown in FIG. 12.

According to the current control of the invention, the D-phase integrator is rewritten only in deceleration by the saturation process, while the Q-phase integrator is rewritten in acceleration and deceleration by the saturation process, to thereby increase the acceleration torque in acceleration and also stabilize the current control for deceleration when the voltage command is saturated in acceleration and deceleration.

Figures 16A, 16B:
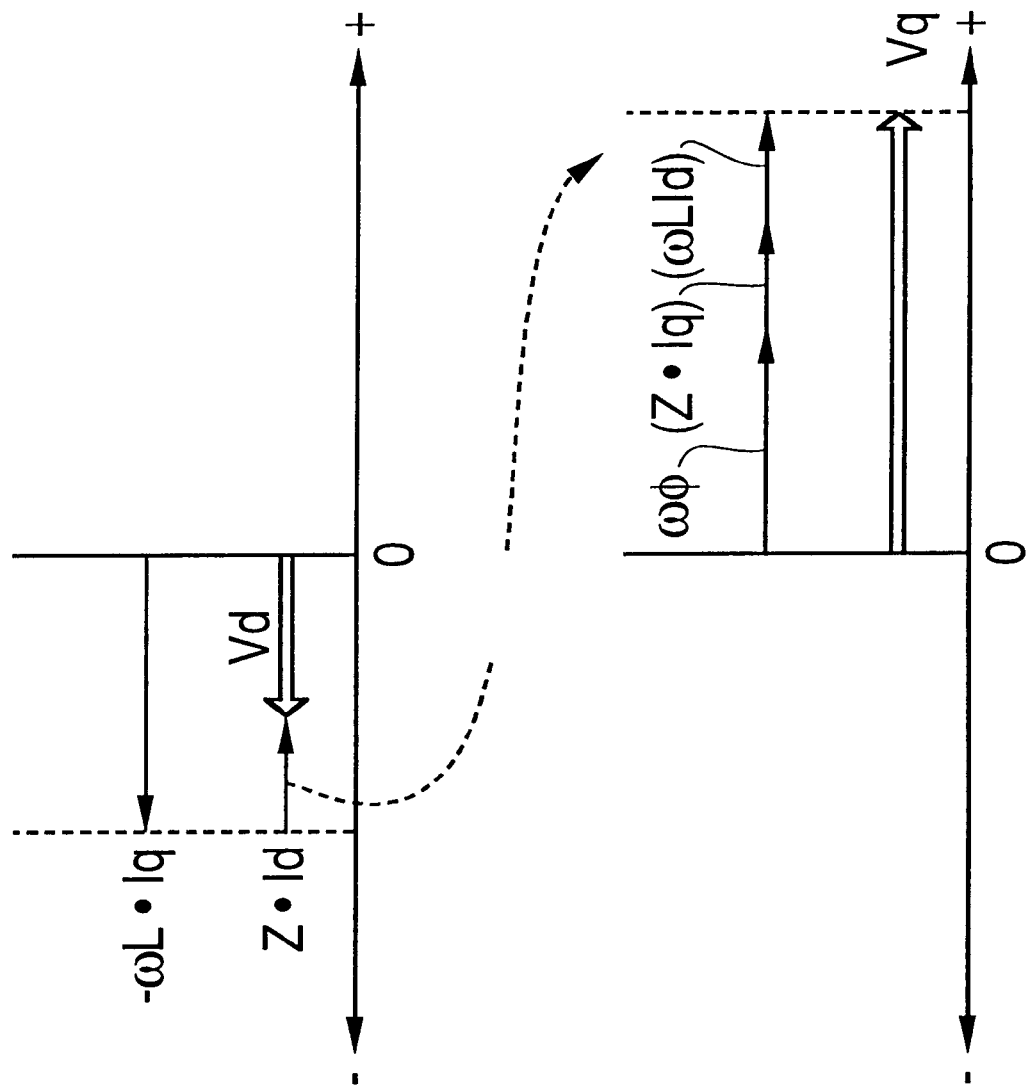
FIGS. 16a and 16b show D-phase and Q-phase voltages when the composite voltage Vc exceeds the voltage limit.
Figure 17:
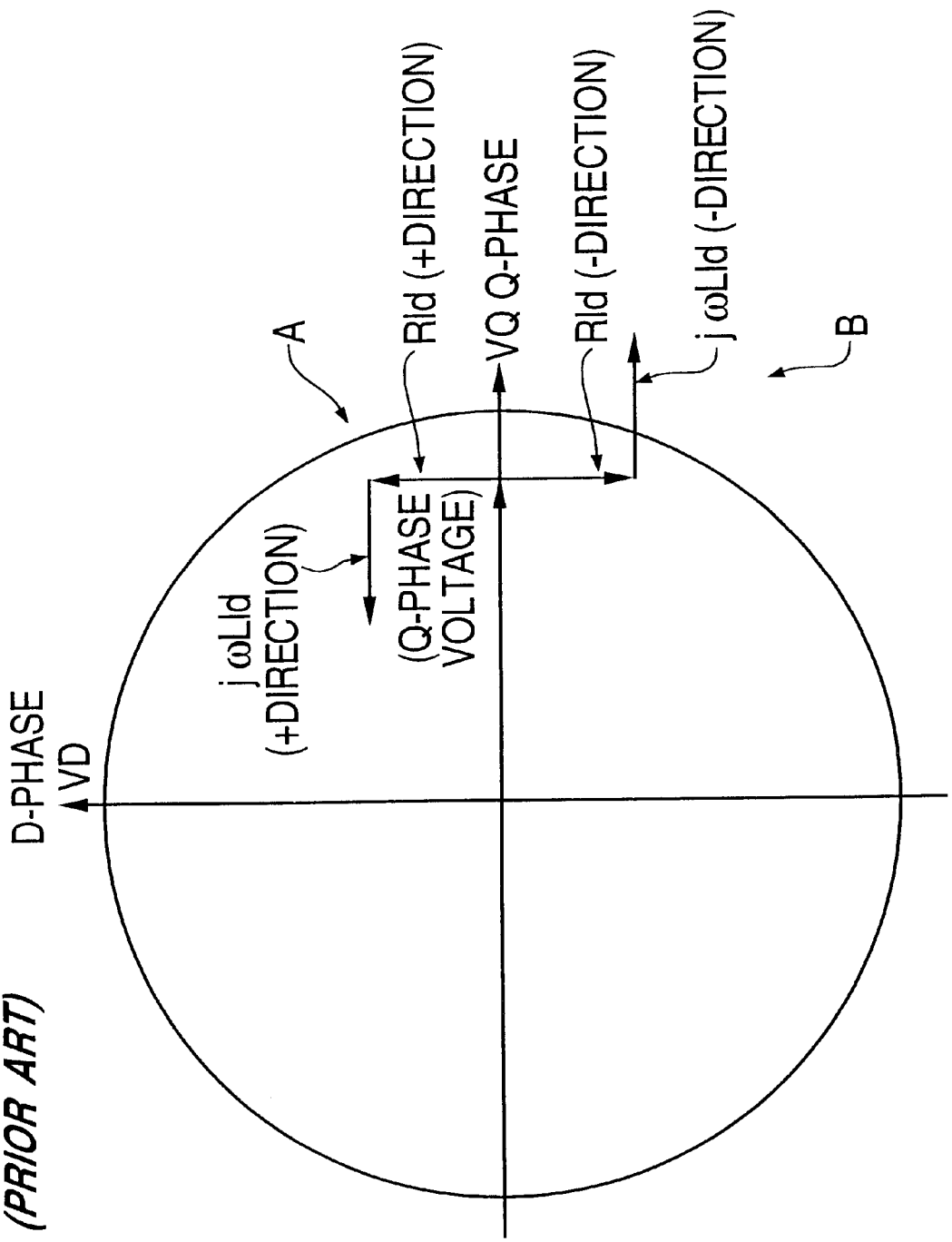
FIG. 17 shows a relation between D-phase and Q-phase voltages in DQ conversion.

First, an operation in acceleration will be described. In the current control system by D-Q conversion, when the D-phase current command Id to flow an invalid current is set to "0" and the current control is performed based on the Q-phase current command Iq, the interference voltage (−ωL·Iq) is produced in D phase due to the Q-phase current Iq likewise in FIG. 16, as indicated by the equation (1).

Figure 3A:
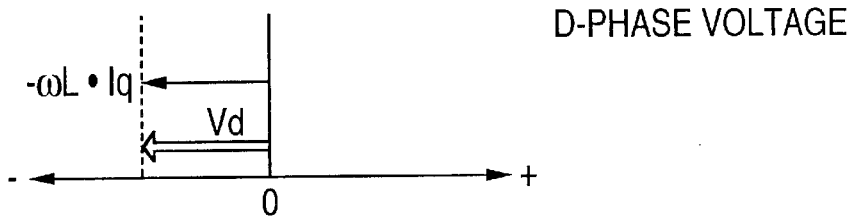
FIGS. 3a and 3b are diagrams for showing states of D-phase and Q-phase voltages during acceleration according to the present invention.
Figure 3B:
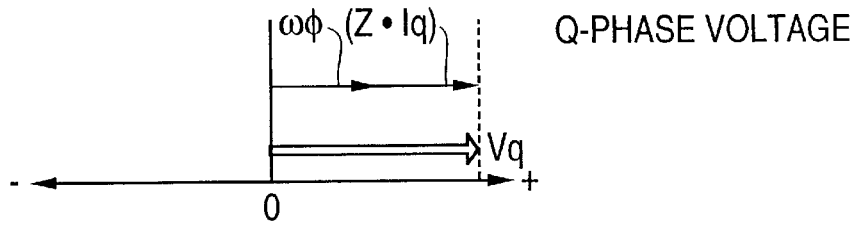

According to the current control of the present invention, when the composite voltage Vc exceeds the voltage limit Vlim as the D-phase and Q-phase command voltages increase, the saturation process is performed with respect to the Q phase but no saturation process is performed with respect to the D phase. With this process, the D-phase voltage Vd can reach (−ωL·Iq), as shown in FIG. 3a, to prevent the D phase current Id from flowing. Since the D-phase current Id does not flow, no interference voltage is generated in the Q-phase voltage V. This relation can be expressed by FIG. 3b and the following equation (10):

$$Vq = \omega\phi + Z \cdot Iq \qquad (10)$$

Figure 3C:
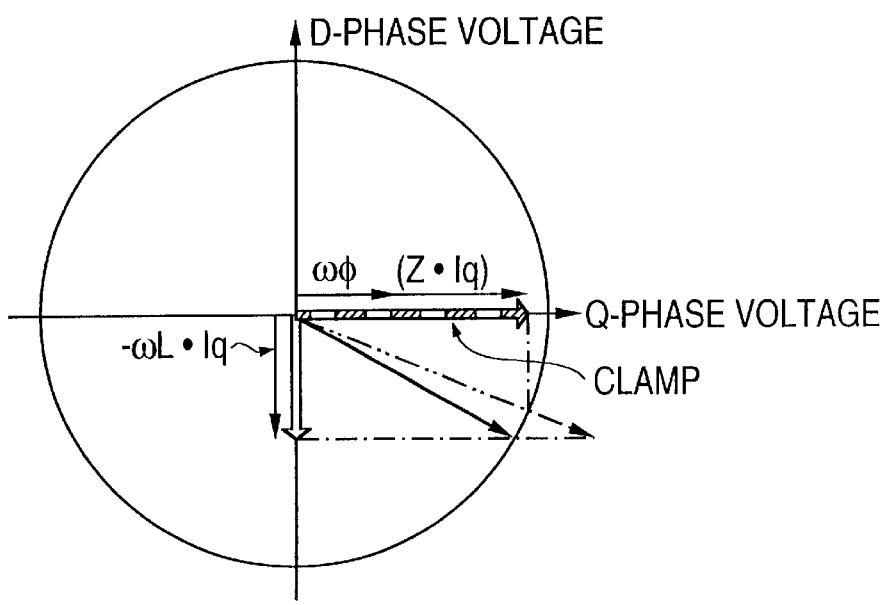
FIGS. 3c and 3d are vector diagrams showing a relation between D-phase voltage and the Q-phase voltage, according to the present invention and the conventional current control method, respectively.
Figure 3D:
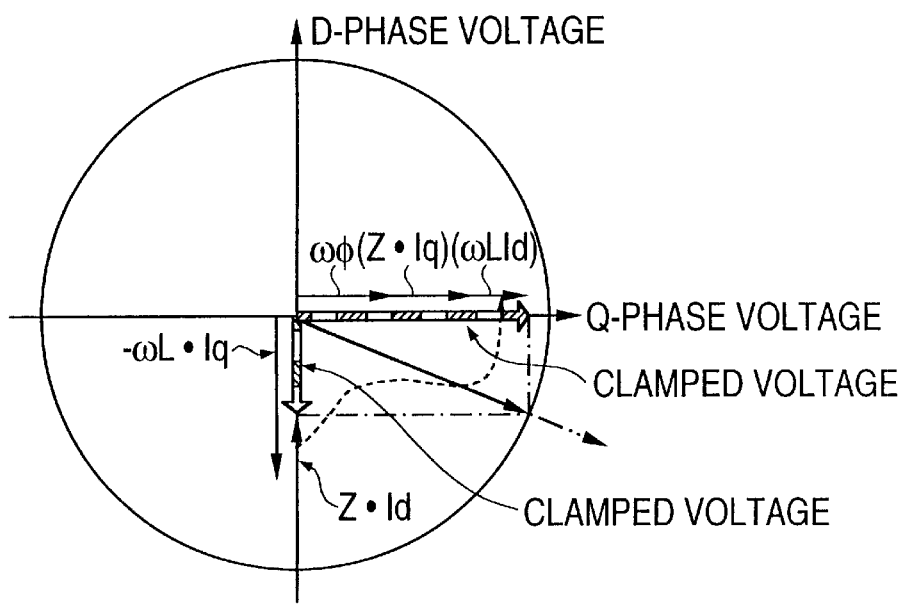

FIGS. 3c and 3d respectively show a relation between the D-phase and Q-phase voltages according to the current control method of the present invention and the conventional current control method. Comparing the present method with the conventional method with respect to the Q-phase voltage, since no interference voltage (ω·L·Iq) is produced in D phase in FIG. 3c according to the present invention, it is possible to take a component by the Q-phase current in the clamped voltage larger than that in FIG. 3d, according to the conventional method. Since the torque of the servomotor is proportional to the Q-phase current, an acceleration characteristic of the servomotor can be improved.

Figure 4A:
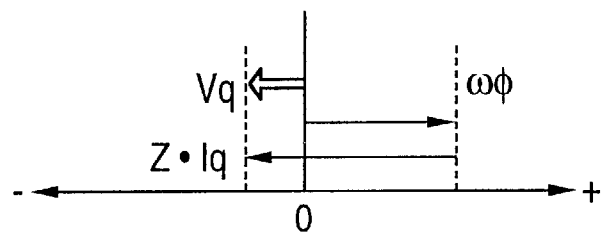
FIGS. 4a and 4b are diagrams for showing states of D-phase and Q-phase voltages, when command voltages are not saturated during deceleration according to the present invention.
Figure 4B:
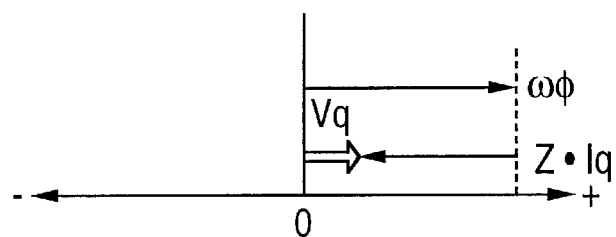

Next, the operation in deceleration will be described. It is assumed that the motor is rotating forward in deceleration, i.e., ω>0 and Iq<0. There is a relation |Z·Iq|>|ωφ| during a low-speed rotation as shown in FIG. 4a, and therefore Vq<0, and there is a relation |Z·Iq|<|ωφ| during a high-speed rotation as shown in FIG. 4b, and therefore Vq>0.

Figure 5A:
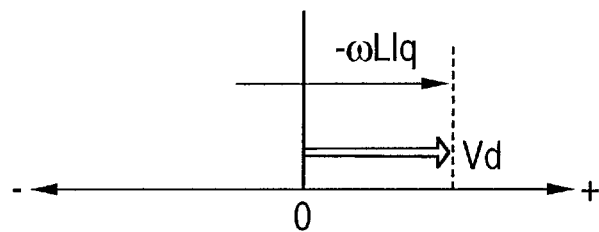
FIGS. 5a, 5b and 5c are diagrams for showing states of D-phase and Q-phase voltages when the command voltages are saturated during deceleration.

When the command voltage is not saturated, the D-phase command voltage reaches the interference voltage (−ωL·Iq), as shown in FIG. 5a, and therefore Id=0. Accordingly, no interference voltage due to the D-phase current Id is produced in the Q phase.

Figure 5B:
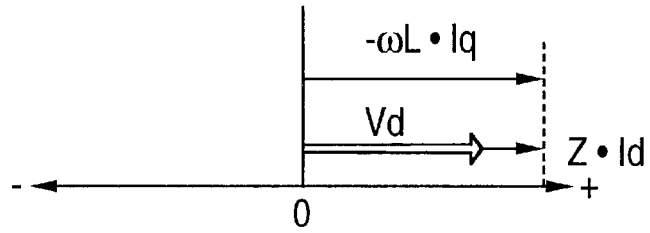
Figure 5C:
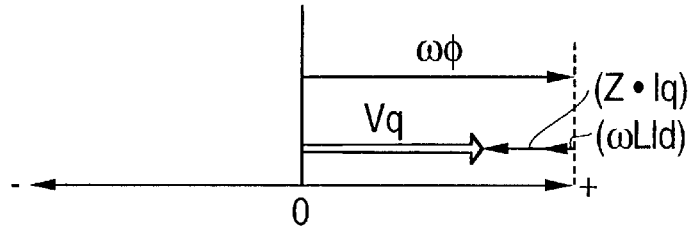

When the command voltage is saturated, the D-phase voltage Vd is clamped so that a negative D-phase current Id flows as shown in FIG. 5b, thus decreasing the Q-phase voltage Vq as shown in FIG. 5c. According to the increase of the D-phase current, the D-phase and Q-phase voltages Vd and Vq decrease to eliminate the voltage saturation.

By rewriting the values of the respective integrators of the D-phase and Q-phase controllers, it is possible to prevent the D-phase current Id from increasing. For example, as expressed by equations (6-1) and (6-2), the value of the D-phase integrator is rewritten as (Vdmax+K2·Idfb)/k1, and the value of the Q-phase integrator is rewritten as (Vqmax+K2·Iqfb)/k1.

In FIG. 2, by rewriting the values of the D-phase and Q-phase integrators to be (Vdmax+K2·Idfb)/k1 and (Vqmax+K2·Iqfb)/k1, respectively in the voltage saturation, the outputs of the D-phase and Q-phase current controller are Vdmax and Vqmax, respectively, so that the saturation process for the integrators is performed and also the command voltage is clamped.

Figure 6:
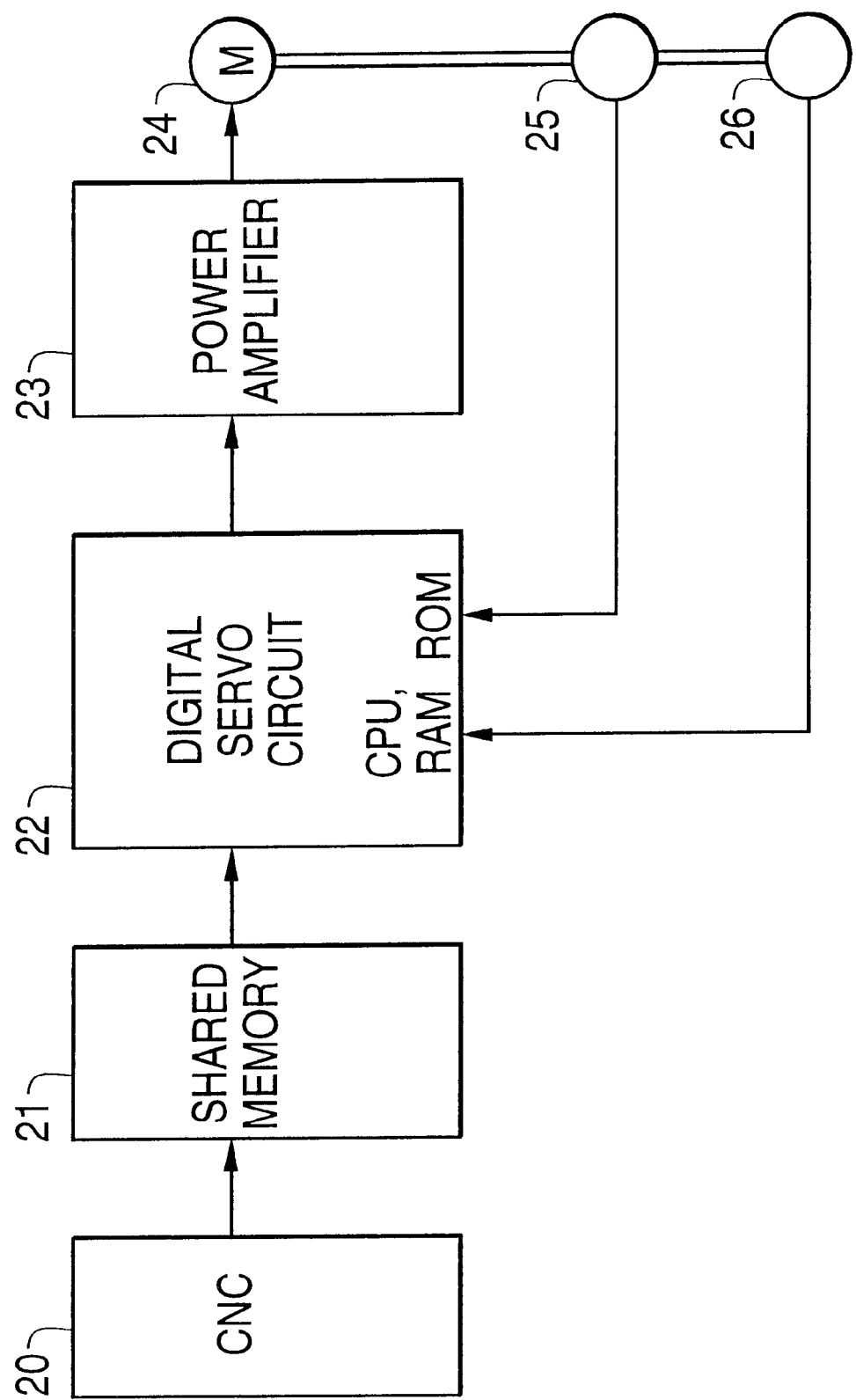
FIG. 6 is a block diagram showing a servo-motor control system for carrying out the method of the invention.

FIG. 6 is a block diagram of a servo-motor control system for carrying out the method of the present invention. The architecture of the servo-motor control system is identical with the conventional digital servo control system and will therefore be generally described here. In FIG. 6, reference number 20 designates a computerized numerical control unit (CNC); 21, a shared RAM; 22, a digital servo circuit having a processor (CPU), RON, RAM, etc.; 23, a power amplifier such as a transistor inverter; M, an AC servomotor; 24, an encoder for generating pulses in response to rotation of the AC servomotor M; and 25, a rotor position detector for detecting a rotor phase.

Figure 7:
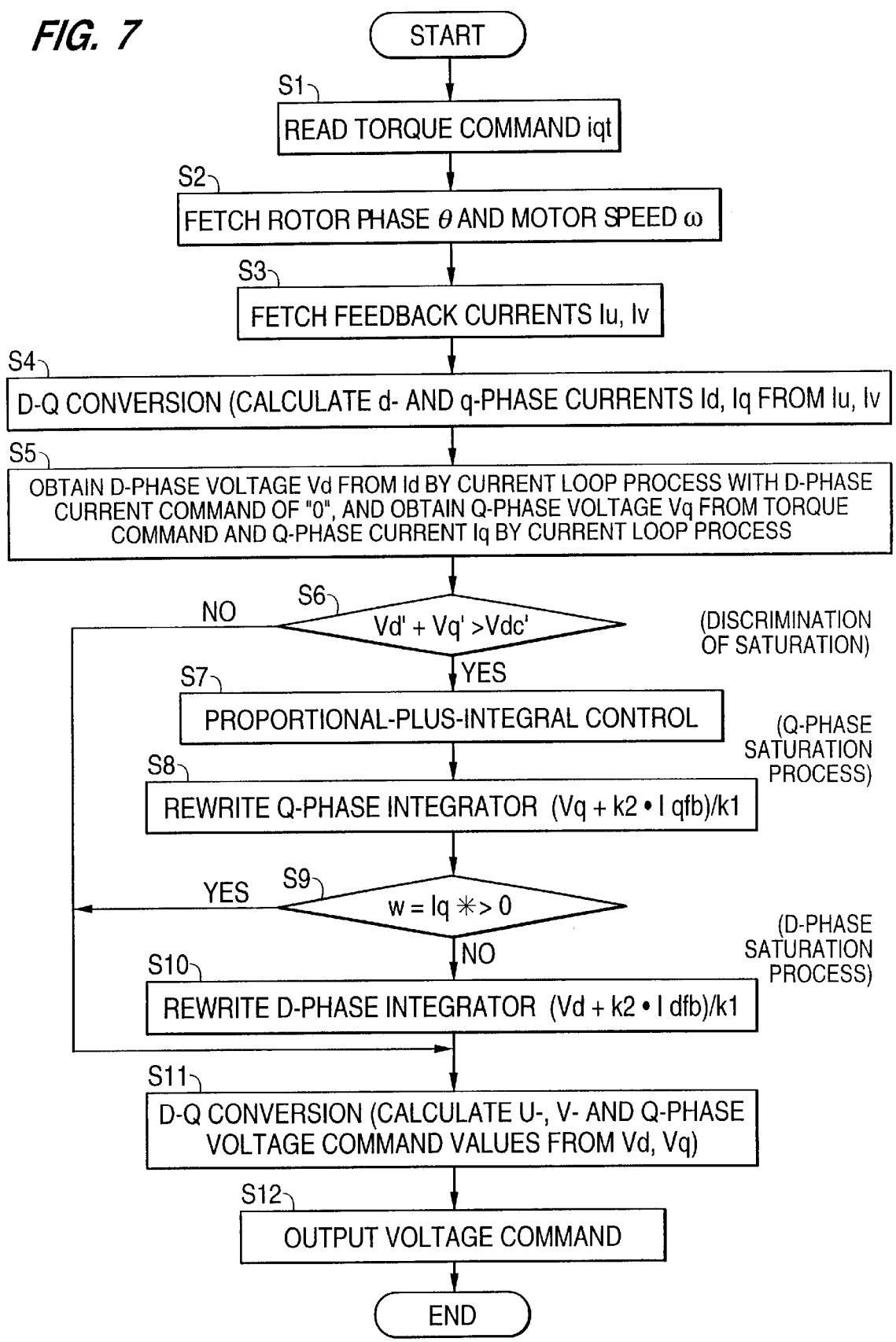
FIG. 7 is a flowchart showing a current loop control process to be performed in every predetermined period by a processor of a digital servo circuit of FIG. 6.

FIG. 7 is a flowchart of a current loop control process to be performed in every predetermined period by the processor of the digital servo circuit 22. The processor of the digital servo circuit 22 reads a position command (or a speed command) from the numerical control unit (CNC) via the shared RAM 21 to perform a position loop process and a speed loop process.

First, the processor reads a torque command Iq* outputted from the speed loop process (Step S1) and fetches a rotor phase θ from the rotor position detector 25 (Step S2).

Then the processor fetches the actual currents Iu and Iv of U and V phases, which are detected by a current detector (step S3), and calculates D-phase and Q-phase currents Id, Iq by the DQ conversion using the fetched U-phase and V-phase actual currents Iu, Iv and the rotor phase θ (Step S4).

An ordinary current loop process (proportional-plus-integral control) is performed to obtain a D-phase command voltage Vd, using the D-phase current Id as a feedback current and the D-phase current command of "0". A current loop process is performed to obtain a Q-phase voltage command Vq, using the torque command read in Step S1 as the Q-phase current command and the Q-phase current value Iq calculated in Step S4 as a feedback current (Step S5).

Then, it is determined whether a composite vector Vc of the D-phase and Q-phase command voltages Vd, Vq obtained in Step S5 exceeds a DC link voltage Vdc, which is the voltage limit value Vlim. Namely, it is determined whether the value of $(Vd^2+Vq^2)$ is larger than the value of $Vdc^2$ (Step S6).

In the case where the composite vector Vc is not exceeding the DC link voltage Vdc, the procedure proceeds to Step S11 where the D-phase and Q-phase command voltages Vd, Vq calculated in Step S5 are converted by DQ conversion to obtain and output U-Phase, V-phase and Q-phase voltage command values (Step S11).

In Step S6, when the composite vector Vc exceeds the DC link voltage Vdc, it is judged that the command voltage is saturated and a proportional-plus-integral control is performed to calculate a Q-phase voltage Vq (Step S7). Then, the processor rewrite the value of the Q-phase integrator to be (Vqmax+K2·Iqfb)/k1, to perform a Q-phase saturation process (Step S8).

Subsequently, it is determined whether the servomotor is in acceleration or deceleration based on the sign of ω·Iq (Step S9).

In the determination of Step S9, if the motor is rotating forward (ω>0) and the torque command Iq* is positive, or if the motor is rotating backward (ω<0) and the torque command Iq* is negative, it is judged that the motor is in acceleration, and the procedure proceeds to Step S11 where U-phase, V-phase and W-phase voltage command values are obtained.

In the determination of Step S9, if the motor is rotating forward (ω>0) and the torque command Iq* is negative, or if the motor is rotating backward (ω<0) and the torque command Iq* is positive, it is judged that the motor is in deceleration and the processor rewrites the value of the D-phase integrator as (Vdmax+K2·Idfb)/k1, to perform a D-phase saturation process (Step S10), and then the procedure proceeds to Step S11 where U-phase, V-phase and W-phase voltage command values are obtained.

In the case where the D-phase saturation process of Step S10 is performed, the Q-phase saturation process is also performed.

The obtained D-phase and Q-phase voltages Vd, Vq are converted by DQ conversion to calculate and output U-phase, V-phase and W-phase voltage command values (Steps S11, S12), to terminate the current loop process of one period.

Figure 8:
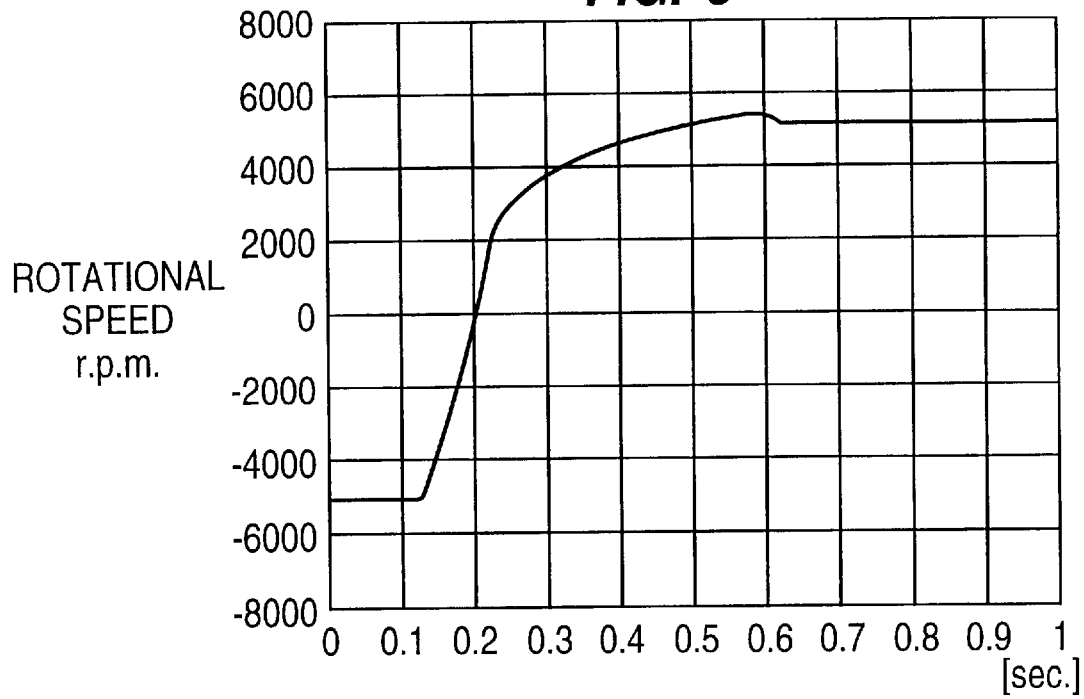
FIG. 8 is a graph showing a response result according to the conventional current control method.
Figure 9:
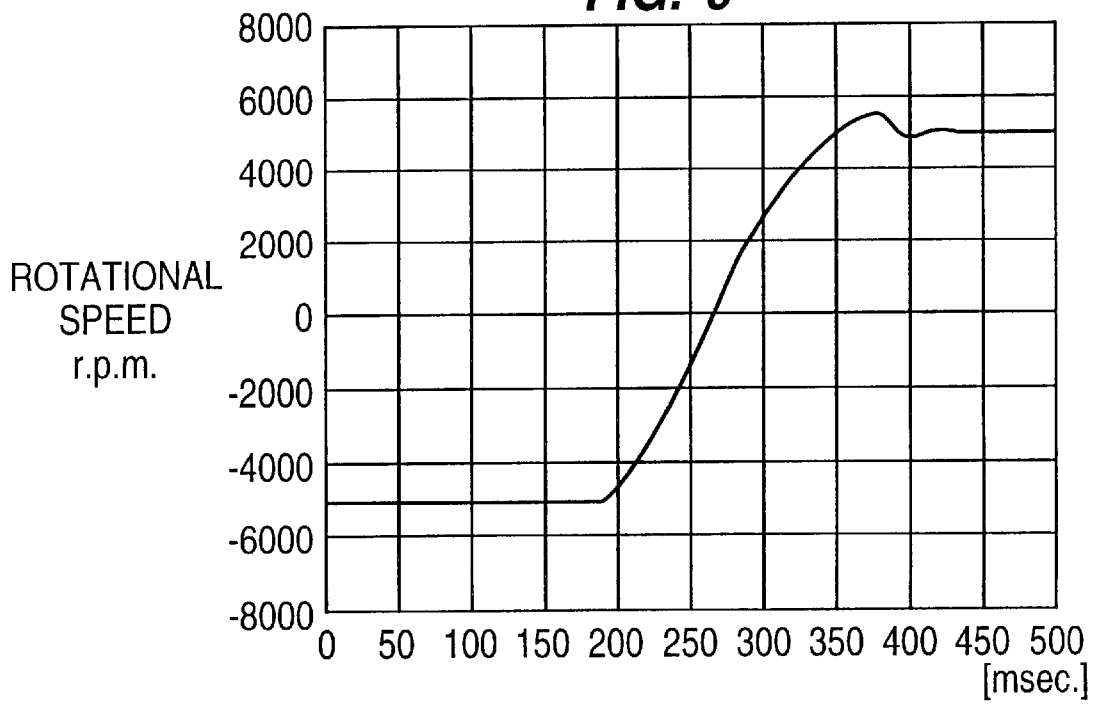
FIG. 9 is a graph showing a response result according to the current control method of the invention.
Figure 10:
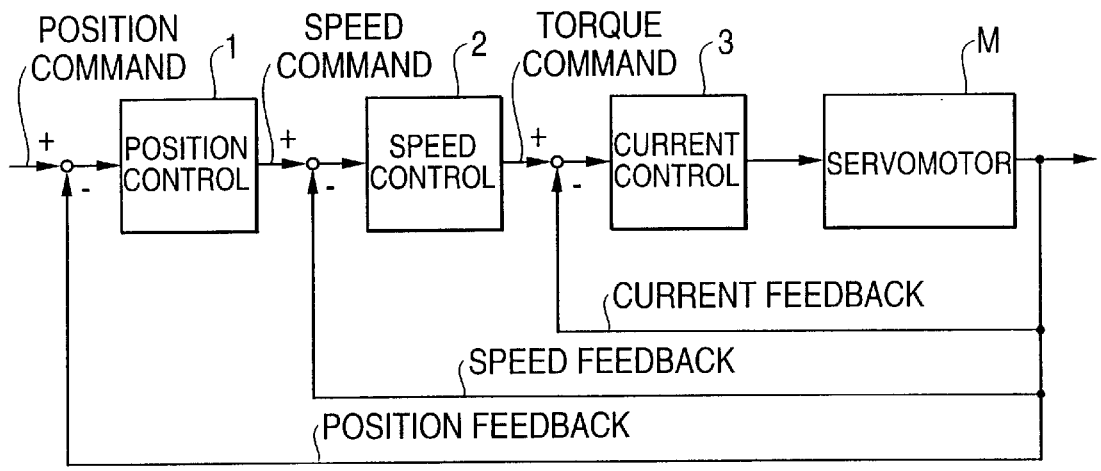
FIG. 10 is a block diagram of a conventional control system for an AC servomotor.
Figure 11:
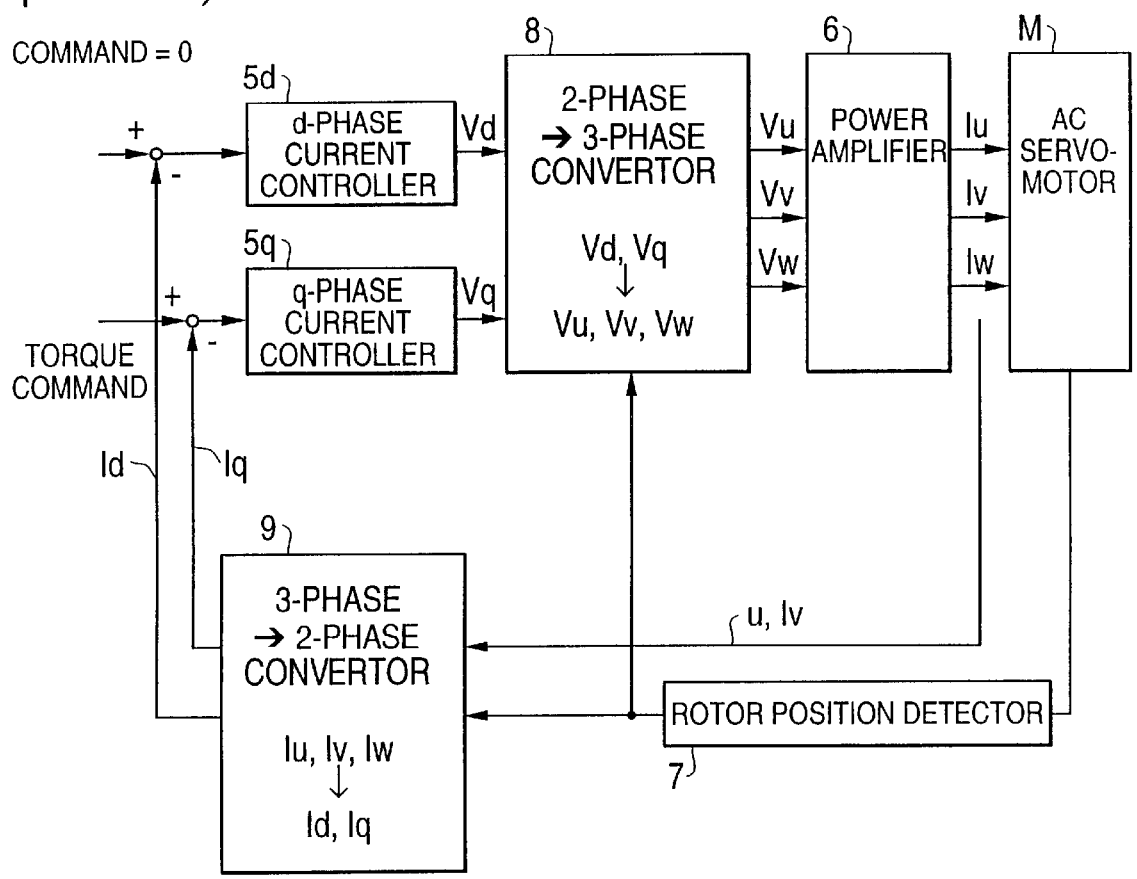
FIG. 11 is a block diagram showing a control system for controlling an AC servomotor by DQ conversion.

FIGS. 8 and 9 show response results according to the conventional method and the method of the present invention, respectively, in which the same speed command is set such that the motor is accelerated stepwise from −1500 rpm to +5000 rpm. As shown in FIG. 8, when the saturation process is performed for both the D and Q phases according to the conventional method, the response characteristic is of approximately 100 ms from −5000 rpm to +3000 rpm and then it takes approximately 600 ms to reach +5000 rpm as the torque drops.

Contrary, as shown in FIG. 9, when the saturation process is performed only for the D phase not for the Q phase according to the present invention, the response characteristic is of approximately 100 ms from −5000 rpm to +3000 rpm likewise the conventional method, but it takes only approximately 200 ms to reach +5000 rpm as the torque slightly drops, thus improving the acceleration characteristic.

As described above, according to the present invention, it is possible to increase the acceleration torque and also to stabilize the current control for deceleration when the voltage command is saturated, in an electric current control of a servomotor using the D-Q conversion.

We claim:

1. A method of controlling an electric current in a servomotor by performing a DQ conversion for converting a three-phase alternating current into a direct current of D- and Q- phases and a direct-current voltage of D- and Q- phases into a three-phase alternating-current voltage and issuing voltage commands to a power amplifier from D-phase and Q-phase current controllers, comprising the steps of:

(a) determining whether said voltage command is saturated over a maximum voltage which said power amplifier is able to output;

(b) determining whether the servomotor is in acceleration or in deceleration; and (c) rewriting an integrator of the D-phase current controller when it is determined that the voltage command is saturated in said step (a) and it is determined that the servomotor is in deceleration in said step (b).

2. A method of controlling a current in a servomotor by issuing voltage commands to a power amplifier from D-phase and Q-phase current control devices by D-Q conversion, which converts an AC three-phase current into D-phase and Q-phase DC currents or converts D-phase and Q-phase DC voltages into an AC three-phase voltage, comprising the steps of:

(a) determining whether the voltage command is saturated over a maximum voltage which the power amplifier is able to output;

(b) determining whether the servomotor is in acceleration or in deceleration; and (c) rewriting an integrator of the Q-phase current controller when it is determined that the voltage command is saturated in said step (a) and it is determined that the servomotor is in acceleration in said step (b).

3. The current controlling method for a servomotor according to claim 1, wherein said step (c) further includes a step of rewriting the integrator of the D-phase current controller so that the D-phase current controller issues a voltage command to cause said power amplifier to output the maximum voltage.

4. The current controlling method for a servomotor according to claim 2, wherein said step (c) further includes a step of rewriting the integrator of the Q-phase current control device so that the Q-phase current controller issues a voltage command to cause the power amplifier to output the maximum voltage.

5. The current controlling method for a servomotor according to claim 1, wherein said step (a) further includes a step of determining whether a vector sum of the D-phase and Q-phase voltage commands exceeds the maximum voltage of said power amplifier.

6. The current controlling method for a servomotor according to claim 1, wherein said step (b) further includes a step of determining whether the servomotor is in acceleration or deceleration based on a direction of rotation of the servomotor and a sign of the Q-phase current command.

7. A servomotor control system for converting a three-phase alternating current into a direct current of D- and Q- phases and a direct-current voltage of D- and Q- phases into a three-phase alternating-current voltage and issuing voltage commands to a power amplifier, comprising:

a circuit determining whether each of the voltage commands are saturated over a maximum voltage which the power amplifier is able to output, and whether the servomotor is in acceleration or deceleration; and a controller rewriting an integrator of the D-phase current when it is determined that the voltage command is saturated in the circuit and it is determined that the servomotor is in deceleration.

8. A servomotor control system for converting a three-phase alternating current into a direct current of D- and Q- phases and a direct-current voltage of D- and Q- phases into a three-phase alternating-current voltage and issuing voltage commands to a power amplifier, comprising:

a circuit determining whether each of the voltage commands are saturated over a maximum voltage which the power amplifier is able to output, and whether the servomotor is in acceleration or deceleration; and a controller rewriting an integrator of the Q-phase current when it is determined that the voltage command is saturated in the circuit and it is determined that the servomotor is in acceleration.

9. The current controlling method for a servomotor according to claim 2, wherein said step (a) further includes a step of determining whether a vector sum of the D-phase and Q-phase voltage commands exceeds the maximum voltage of said power amplifier.

10. The current controlling method for a servomotor according to claim 2, wherein said step (b) further includes a step of determining whether the servomotor is in acceleration or deceleration based on a direction of rotation of the servomotor and a sign of the Q-phase current command.

* * * * *